(12) United States Patent
Marra et al.

(10) Patent No.: US 7,340,329 B2
(45) Date of Patent: Mar. 4, 2008

(54) SYSTEM AND METHOD FOR CONTROLLING AN ELECTRIFIED VEHICLE

(75) Inventors: Jon Marra, Henderson, NY (US); Bryan McLaughlin, Watertown, NY (US); Richard Matusiak, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 630 days.

(21) Appl. No.: 10/995,227

(22) Filed: Nov. 24, 2004

(65) Prior Publication Data

US 2006/0108872 A1    May 25, 2006

(51) Int. Cl.
*B61C 3/00* (2006.01)
*G05D 3/00* (2006.01)

(52) U.S. Cl. ............... 701/19; 701/20; 105/49
(58) Field of Classification Search ............ 701/19–20, 701/200, 213–215; 307/9.1, 10.1; 105/49
See application file for complete search history.

(56) References Cited

U.S. PATENT DOCUMENTS

| | | | |
|---|---|---|---|
| 3,957,236 A | 5/1976 | Phelps et al. | |
| 4,301,899 A | 11/1981 | McSparran et al. | |
| 5,091,855 A * | 2/1992 | Umehara et al. | 701/23 |
| 5,111,401 A * | 5/1992 | Everett et al. | 701/24 |
| 5,280,418 A | 1/1994 | Griffin | |
| 6,144,901 A | 11/2000 | Nickles et al. | |
| 6,371,416 B1 | 4/2002 | Hawthorne | |
| 6,382,378 B1 * | 5/2002 | Cornic | 191/6 |
| 6,480,766 B2 | 11/2002 | Hawthorne et al. | |
| 7,162,337 B2 * | 1/2007 | Peltz et al. | 701/19 |
| 2005/0240322 A1 | 10/2005 | Peltz et al. | |

FOREIGN PATENT DOCUMENTS

| | | |
|---|---|---|
| DE | 43 18 934 C1 | 8/1994 |
| EP | 1 391 685 A | 2/2004 |
| EP | 1 591 301 A | 11/2005 |

* cited by examiner

*Primary Examiner*—Yonel Beaulieu
(74) *Attorney, Agent, or Firm*—Barnes & Thornburg LLP

(57) ABSTRACT

A control system and method which includes storing the geographic location of the neutral sections along the path onboard the vehicle. A GPS system on the vehicle determines the geographic location of the vehicle. A program of the control system determines the position of the vehicle relative to the position of the neutral section from memory using the GPS to determine the location of the vehicle. Next, it provides a control for maintaining the circuit breaker of the vehicle open as the source collector passes through the neutral section.

17 Claims, 3 Drawing Sheets

SYSTEM AND METHOD FOR CONTROLLING AN ELECTRIFIED VEHICLE

BACKGROUND AND SUMMARY OF THE DISCLOSURE

The present disclosure relates generally to electrified vehicles that travel along a path and receive their source of energy from a sectionalized electrified conductor running along the path, wherein the electrified sections are separated by neutral sections, and, more specifically, to an improved method of operating an electrified vehicle.

Electrified vehicles (for example, locomotives, transit cars or buses) travel along a path and have a source collector which cooperates with a sectionalized electrified conductor running along the path to receive its electrical energy. The electrified sections are generally separated by neutral sections. This allows the various electrified sections to be electrified by different power stations. The vehicle generally includes a source collector and a circuit breaker which is opened by a control system when the control system determines that the source collector is passing through a neutral section. This provides appropriate isolation of the sectionalized electrified conductors from each other and prevents damage to the electrical system of the electrified vehicle. The sectionalized electrified conductor may be a third rail in a rail or transit system or may be an overhead conductor in a rail, transit or bus system.

Various methods have been used to determine when the vehicle is in electrical cooperation with the neutral section and to appropriately control the vehicle in the neutral section. These generally have included proximity sensing means to detect markers on each side of the neutral section, as shown in U.S. Pat. No. 4,301,899, or a wayside signal producing device, as described in U.S. Pat. No. 3,957,236.

The present control system and method includes storing the geographic location of the neutral sections along the path onboard the vehicle. A GPS system on the vehicle determines the geographic location of the vehicle. A program of the control system determines the position of the vehicle relative to the position of the neutral section from memory using the GPS to determine the location of the vehicle. Next, it provides a control for maintaining the circuit breaker of the vehicle open as the source collector passes through the neutral section.

To fine tune the GPS to determine location and/or if the GPS is not available (for example, in tunnels), a sensor is provided for sensing movement of the vehicle. The distance traveled by the vehicle is determined and used with the GPS determined location to determine the location of the vehicle. To compensate for the accuracy of the GPS to determine location, a tolerance distance is added to the location in determining when to open the circuit breaker. The same is used for when to close the circuit breaker or after exiting the neutral section. The length of the neutral section may also be provided in storage and used to determine when the vehicle has left the neutral section. Also, a determination is made as to whether the electrical cooperation with the electrical section has been re-established. This is used with verification of the position of the source collector on an electrified section with the GPS determined location before the circuit breaker is re-closed.

The electrified vehicle may be a single vehicle or part of a group of vehicles. Also, the vehicle may be one or more powered vehicles connected with non-powered vehicles. In any of these cases, each electrified vehicle will have an appropriate source collector and circuit breaker and control of the circuit breaker. Each electrified vehicle may have its own GPS system and individually controls its circuit breaker as its source collector passes through the neutral section. As an alternative, a single master electrified vehicle may have a GPS system. It would then determine the location of each of the electrified vehicles in the train or consist relative to the neutral section. It would then send signals to each of the electrified vehicles to control its circuit breaker as it passes through the neutral section based on the location information determined at the master electrified vehicle. The master controller would predetermine the position of the vehicles within the train so as to be used with the GPS location of the vehicle with the master controller.

These and other aspects of the present disclosure will become apparent from the following detailed description of the disclosure, when considered in conjunction with accompanying drawings.

DETAILED DESCRIPTION OF THE PREFERRED EMBODIMENTS

Figure 1:
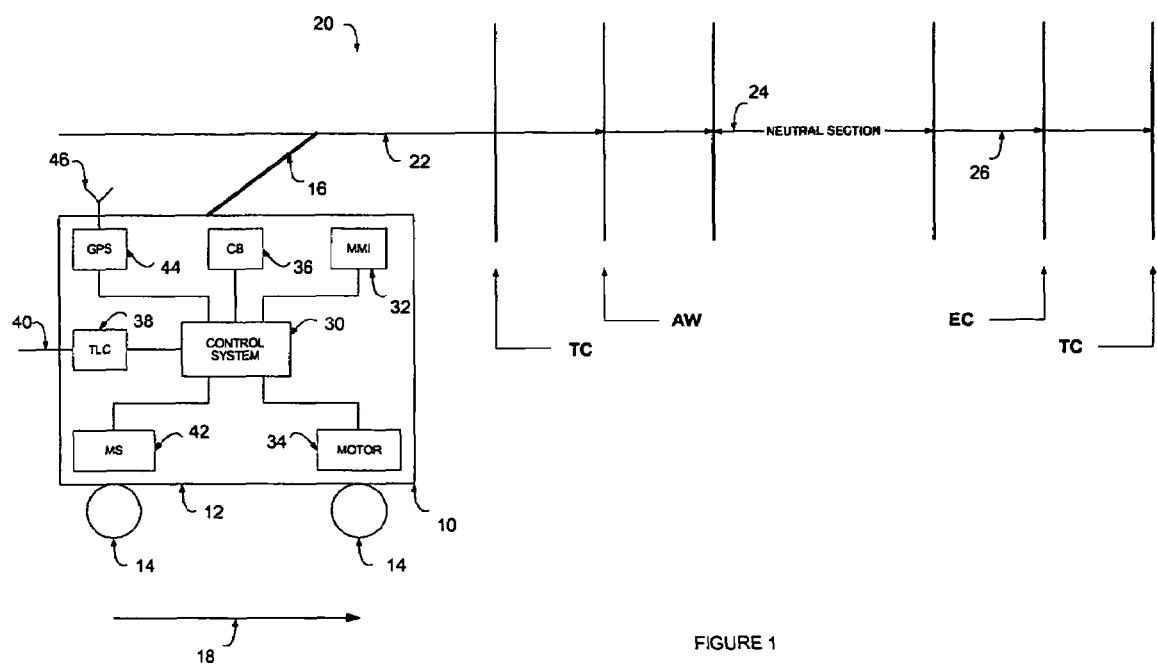
FIG. 1 is a schematic of an electrified vehicle with respect to a path and sectionalized electrified conductor according to the present disclosure.

An electrified vehicle 10 includes a body 12 and wheels 14 moving along a path indicated by arrow 18. Adjacent the path 18 is a sectionalized electrified conductor 20 including electrified sections 22, 26 separated by a neutral non-electrified section 24. A source collector 16 cooperates with the sectionalized electrified conductor 20 to provide electrical energy from the electrified conductor 20 to the vehicle 10. As previously stated, the vehicle 10 may be a rail or road vehicle with the electrified conductor 20 being a third rail or an overhead wire. Source collector 16 would be a variety of collectors, including direct contact or inductive coupling. The electrified conductor 20 may be a catenary system, and the source collector 16 would be a pantograph. This is but one example, but other systems may be used.

Figure 2:
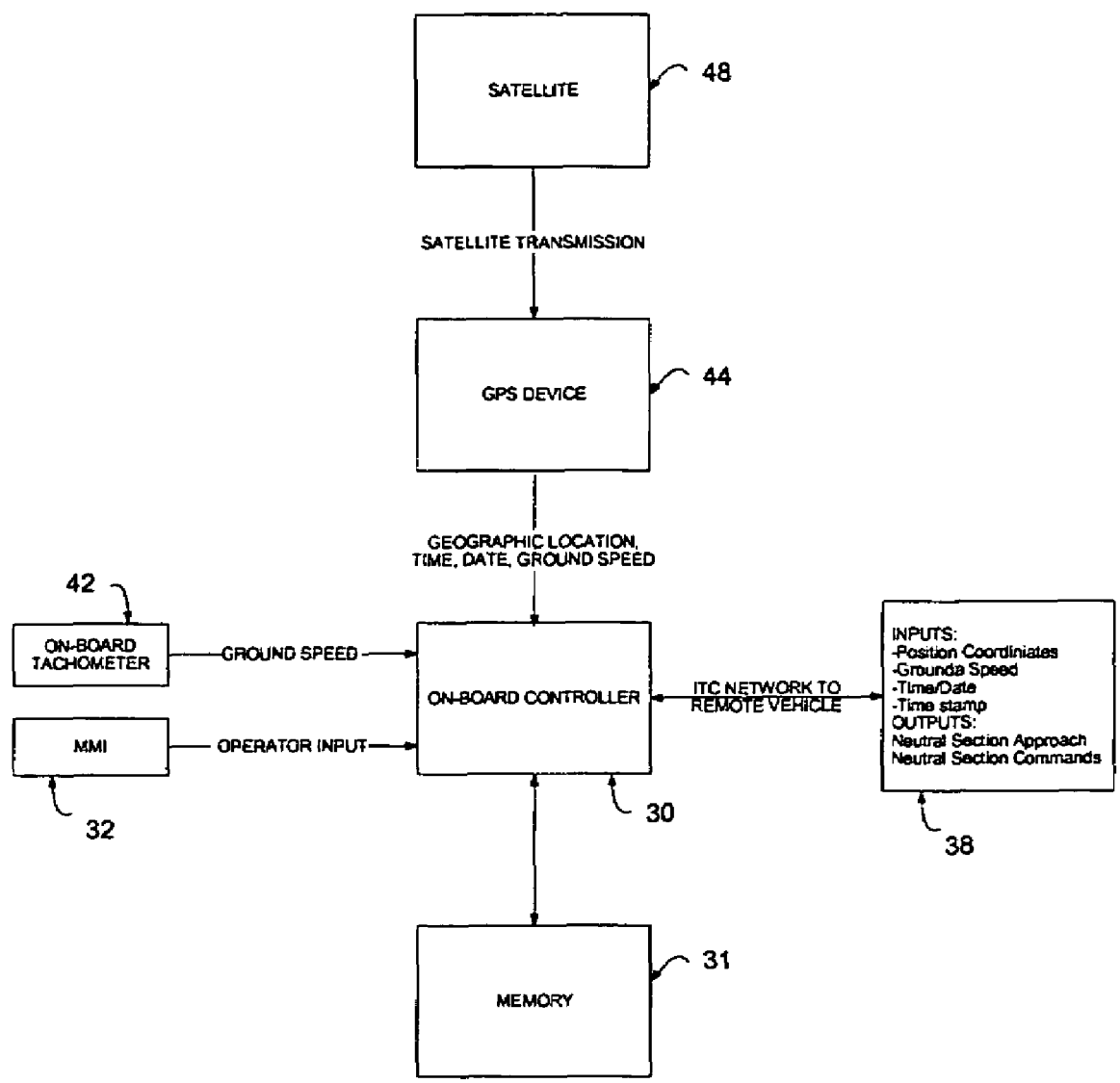
FIG. 2 is a block diagram showing the control system of the vehicle of FIG. 1.

Referring to FIGS. 1 and 2, the electrified vehicle 10 includes a control system or onboard controller 30 having a man-machine interface (MMI) 32 that provides input controls, feedback display and alarm mechanisms to and from the operator. The controller 30 also controls an electric motor 34 connected to the wheels 14 and a circuit breaker 36 that feeds the electrical vehicle system from the source collector 16. A motion sensor or movement sensor 42 senses the movement of the vehicle. As illustrated in FIG. 2, this may be an onboard tachometer cooperating with one of the wheels 14. A GPS system 44 is provided connected to the controller 30 and has an antenna 46 to communicate with a satellite 48. The GPS 44 is a geographic information system that relies on satellite communication and tracking to identify specific latitude, longitude and altitude coordinates. As also noted in FIG. 2, the GPS device 44 may provide time, date and ground speed, as well as geographic location.

Where there is more than one electrified car in a consist or train, the control system 30 communicates through train line controller 38 over train line 40 to other vehicles, cars, locomotives, electrified or non-electrified vehicles. This may be an intra-train communication (ITC) system or network, as described for freight trains or any other communication system or network. A typical example for freight trains is described in the American Association of Railroads' Specifications S-4200, S-4230 and S-4250. On a freight train, this would also carry communications for the electrically controlled pneumatic (ECP) brake portions, as well as the wire distributive power (WDP) for the various locomotives. Again, the use of structure with respect to a freight train is not limiting but is merely an example of one implementation.

As will be discussed below with respect to the operation of the system, vehicle 10 approaching the neutral section 24 reaches a first milestone known as a tolerance compensation point TC. This is a distance compensation added to the system to accommodate for the tolerance or accuracy of the location determining devices as well as latency. The next point or milestone is the approach warning AW. Upon leaving the neutral section 24, there is an exit confirmation milestone EC and, finally, an exit tolerance compensation TC.

The present system with GPS and onboard storage of location of the neutral section 24 allows automatic opening of the circuit breaker as the source collector 16 passes through the neutral section 24. The present, fully automatic system operates without any costly wayside signaling devices. Currently, the method of achieving the opening of the circuit breaker is manual operation by the onboard operator, automatic commands from wayside signaling devices or an onboard distance counter initiated by the operator with respect to distance traveled. While the present system is automatic, it does not exclude local operator command control.

Figure 3:
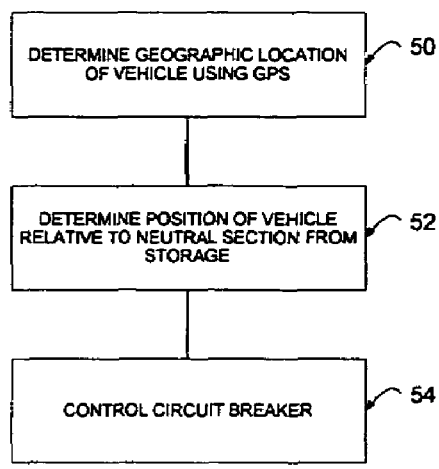
FIG. 3 is a flow chart of the method of the present disclosure for a single vehicle.

A basic system for a single vehicle is illustrated in FIG. 3. The first step 50 is determining the geographic location of the vehicle using the GPS system 44.

At the next step 52, there is a determination of the position of the vehicle with respect to the neutral section 24 which is received from onboard storage or memory 31. Based on this relative positioning, the system controller 30 controls the circuit breaker 36 at step 54. As just described, the object is for the circuit breaker 36 to be opened prior to the source collector 16 entering the neutral section 24. This would include the tolerance distance TC. Prior to opening the main circuit breaker 36, the control system 30 may also terminate the local high current demand by idling subsystems, such as traction motors, blowers, etc., prior to entering the neutral section 24.

As the vehicle 10 starts to exit the neutral section 24, there is a determination as to whether the source collector 16 has re-established cooperation with the electrified conductor 26, thus passing out of the neutral section 24. Once this has occurred, there is a confirmation that the neutral section 24 has been cleared using the GPS information. If this confirmation has occurred, the circuit breaker 36 is automatically closed by the control system 30. Normal operation can be re-established connecting the subsystems that were set to idle.

The GPS information can be used to calculate a scaling factor to increase the accuracy of the sensor 42 as the territory is traversed. The GPS geographic location can then be verified by using the sensor 42, as well as visual sighting or other information inputted at the MMI 32. It is also important that this information be available when the GPS is inoperable, such as when passing through a tunnel or any loss of signal. The last GPS signal location will be used, and the motion sensor 42 will increment the information from the last GPS location.

Figure 4:
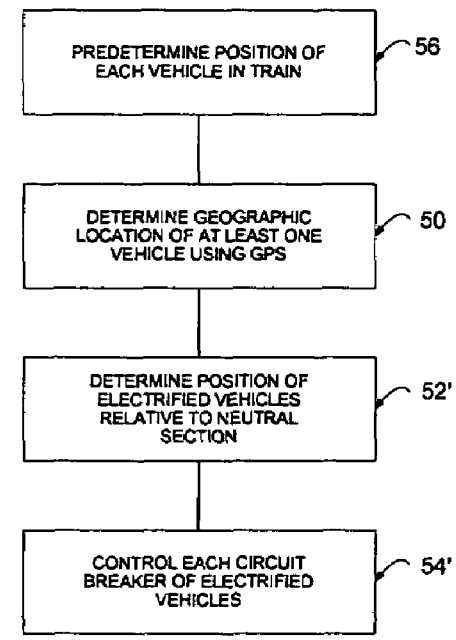
FIG. 4 is a block diagram, according to the present disclosure, for a train or consist having a plurality of electrified vehicles.

If other electrified vehicles are in the train or consist, the system will operate according to FIG. 4. The position of each of the vehicles in the train or consist is pre-determined at step 56. This can either be manually inputted or determined in a make-up and sequencing operation, as shown, for example, in U.S. Pat. No. 5,966,084. In step 50, the geographic location of at least one of the vehicles is determined using the GPS 44. In step 52', the position of each of the electrified vehicles with respect to the position of the neutral section 24 is determined. Finally, at step 54', the circuit breakers of each of the electrified vehicles are controlled. The method of FIG. 4 may be carried out by a lead or main controller having the GPS signals and providing appropriate signals to local controllers on each of the cars to control their circuit breakers as they individually pass through the neutral section 24. Alternatively, each electrified car may have its own GPS system and determine its own location and control its own circuit breaker.

If a single main or lead unit is at the front of the train, it may perform the following operations as it approaches the neutral section 24. At first, it transmits to each remote electrified vehicle that a neutral section is approaching via train line 40. Then, it performs the operation previously described of idling subsystems and automatically opening its local circuit breaker prior to entering the neutral section 24. One way of accurately determining when the following electrified vehicles enter the neutral section 24 is to initiate a counter and use the sensor 42 to actually determine when the specific remote vehicles are in the neutral section 24. It will then transmit commands to the remote vehicles at the appropriate time of their entering the neutral section 24 to shut down their idle subsystems, as well as to open their main circuit breaker 36. As each of the following electrified vehicles approach the neutral section 24, it will acknowledge receipt of the lead transmission of the neutral section 24 approach from the lead unit. It will idle its subsystems and automatically open its circuit breaker 36. As it exits the neutral section 24, it will monitor for local re-establishment of cooperation between the source collector 16 and the electrified conductor 20. It will also respond to lead commands for the verification that it has exited the neutral section 24.

The internal memory 31 allows the GPS 44 to retain critical data, such as last known position, date and time, track profile, and neutral section locations. All intra-vehicle communication within the train of local coordinates shall be time-stamped to identify specific location of the reporting vehicle relative to a specific time. To compensate for known internal system latencies, this information can be normalized to real-time status using ground speed historical data from the sensors 42.

As can be seen from the above description, the present system and method allows for automatic control of the circuit breaker 36 with respect to the neutral section 24. The GPS system 44 allows the automatic operation to reliably and economically occur.

Although the present disclosure has been described and illustrated in detail, it is to be clearly understood that this is done by way of illustration and example only and is not to be taken by way of limitation. The scope of the present disclosure is to be limited only by the terms of the appended claims.

What is claimed:

1. An electrified vehicle for traveling over path having a sectionalized electrified conductor running along the path, the electrified sections being separated by neutral sections, the vehicle including a source collector and a circuit breaker which is opened by a control system when the control system determines that source collector is passing through the neutral section; the vehicle being part of a train of vehicles; another vehicles in the train including a source collector and a circuit breaker which is opened by a control system when the control system determines the source collector of the another vehicle is passing through the neutral section; and the control system on the vehicle and the another vehicle comprising:
- a memory storing the geographic location of the neutral sections along the path;
- a GPS system for determining the geographic location of the vehicle; and
- a program for determining the position of the vehicle relative to the position of the neutral section from the memory device using the GPS determined location of the vehicle and provides controls for maintaining the circuit breaker open as the source collector passes through the neutral section.

2. The vehicle of claim 1, wherein the control system further includes a sensor for sensing movement of the vehicle, and the program determines the distance traveled by the vehicle and uses the distance traveled with the GPS determined location to determine the location of the vehicle.

3. An electrified vehicle for traveling over path having a sectionalized electrified conductor running along the path, the electrified sections being separated by neutral sections, the vehicle including a source collector and a circuit breaker which is opened by a control system when the control system determines that source collector is passing through the neutral section; wherein the vehicle is part of a train of vehicles; another vehicle includes a source collector and a circuit breaker which is opened by a control system; the vehicle has a master control system comprising:
- a memory storming the geographic location of the neutral sections along the path;
- a GPS system for determining the geographic location of the vehicle; and
- a program for determining the position of the vehicle relative to the position of the neutral section from the memory device using the GPS determined location of the vehicle and provides controls for maintaining the circuit breaker open as the source collector passes through the neutral section;
- wherein the program determines the position of each vehicle of the train relative to the neutral section and signals the remote control systems of the another vehicle to maintain its circuit breaker open as the source collector of the another vehicle passes through the neutral section.

4. The vehicle of claim 3, wherein the master control system predetermines the position within the train of each vehicle.

5. The vehicle of claim 1, wherein the control system opens the circuit breaker before the vehicle enters the neutral section.

6. An electrified vehicle for traveling over path having a sectionalized electrified conductor running along the path, the electrified sections being separated by neutral sections, the vehicle including a source collector and a circuit breaker which is opened by a control system when the control system determines that source collector is passing through the neutral section; the control system comprising:
- a memory storing the geographic location of the neutral sections along the path;
- a GPS system for determining the geographic location of the vehicle; and
- a program for determining the position of the vehicle relative to the position of the neutral section from the memory device using th GPS determined location of the vehicle, adding a tolerance distance to the location in determining when to open the circuit breaker before the source collector enters the neutral section and providing controls for maintaining the circuit breaker open as the source collector passes through the neutral section.

7. An electrified vehicle for traveling over path having a sectionalized electrified conductor running along the path, the electrified sections being separated by neutral sections, the vehicle including a source collector and a circuit breaker which is opened by a control system when the control system determines that source collector is passing through the neutral section; the control system comprising:
- a memory storing the geographic location of the neutral sections along the path;
- a GPS system for determining the geographic location of the vehicle;
- a program for determining the position of the vehicle relative to the position of the neutral section from the memory device using the GPS determined location of the vehicle and provides controls for maintaining the circuit breaker open as the source collector passes through the neutral section; and
- the control system idles electrical subsystems to reduce current load before the source collector enters the neutral section.

8. An electrified vehicle for traveling over path having sectionalized electrified conductor running along the path, the electrified sections being separated by neutral sections, the vehicle including source collector and a circuit breaker which is opened by a control system when the control system determines that source collector is passing through the neutral section; the control system comprising:
- a memory storing the geographic location of the neutral sections along the path and the length of the neutral section;
- a GPS system for determining the geographic location of the vehicle; and
- a program for determining the position of the vehicle relative to the position of the neutral section from the memory device using the GPS determined location of the vehicle and provides controls for maintaining the circuit breaker open as the source collector passes through the neutral section; and
- the program determining that the source collector has left the neutral section from the stored length and providing controls to close the circuit breaker.

9. An electrified vehicle for traveling over path having a sectionalized electrified conductor running along the path, the electrified sections being separated by neutral sections, the vehicle including a source collector and a circuit breaker which is opened by a control system when the control system determines that source collector is passing through the neutral section; the control system comprising:
- a memory storing the geographic location of the neutral sections along the path;
- a GPS system for determining the geographic location of the vehicle;

a program for determining the position of the vehicle relative to the position of the neutral section from the memory device using the GPS determined location of the vehicle and provides controls for maintaining the circuit breaker open as the source collector passes through the neutral section; and the control system determining re-establishment of electrical contact with an electrified section and verifying position of the source collector on an electrified section with the GPS determined location before closing the circuit breaker.

10. A method of controlling an electrified vehicle traveling over path having a sectionalized electrified conductor running along the path, the electrified sections being separated by neutral sections, the vehicle including a source collector cooperating with the electrified conductor and a circuit breaker which is opened by a control system when the control system determines that source collector is passing through the neutral section; the method comprising:

determining the geographic location of the vehicle using a GPS system;

determining the position of the vehicle relative to the position of the neutral section from the geographic location of the neutral section stored on the vehicle and the GPS determined location of the vehicle and adding a tolerance distance to the location in determining when to open the circuit breaker before the source collector enters the neutral section; and opening the circuit breaker before the source collector enters the neutral section and closing the circuit breaker after the source collector leaves the neutral section.

11. The method of claim 10, including sensing movement of the vehicle, determining the distance traveled by the vehicle, and using the distance traveled with the GPS determined location to determine the location of the vehicle.

12. A method of controlling an electrified vehicle traveling over path having a sectionalized electrified conductor running along the path, the electrified sections being separated by neutral sections, the vehicle including a source collector cooperating with the electrified conductor and a circuit breaker which is opened by a control system when the control system determines that source collector is passing through the neutral section; the method comprising:

determining the geographic location of the vehicle using a GPS system;

determining the position of the vehicle relative to the position of the neutral section from the geographic location of the neutral section stored on the vehicle and the GPS determined location of the vehicle;

opening the circuit breaker before the source collector enters the neutral section and closing the circuit breaker after the source collector leaves the neutral section; and idling electrical subsystems to reduce current load before the vehicle enters the neutral section.

13. A method of controlling an electrified vehicle traveling over path having a sectionalized electrified conductor running along the path, the electrified sections being separated by neutral sections, the vehicle including a source collector cooperating with the electrified conductor and a circuit breaker which is opened by a control system when the control system determines that source collector is passing through the neutral section; the method comprising:

determining the geographic location of the vehicle using a GPS system;

storing the length of the neutral section;

determining the position of the vehicle relative to the position of the neutral section from the geographic location of the neutral section stored on the vehicle and the GPS determined location of the vehicle;

determining that the vehicle has left the neutral section from the stored length and opening the circuit breaker before the source collector enters the neutral section and closing the circuit breaker after the source collector leaves the neutral section.

14. A method of controlling an electrified vehicle traveling over path having a sectionalized electrified conductor running along the path, the electrified sections being separated by neutral sections, the vehicle including a source collector cooperating with the electrified conductor and a circuit breaker which is opened by a control system when the control system determines that source collector is passing through the neutral section; the method comprising:

determining the geographic location of the vehicle using a GPS system;

determining the position of the vehicle relative to the position of the neutral section from the geographic location of the neutral section stored on the vehicle and the GPS determined location of the vehicle;

opening the circuit breaker before the source collector enters the neutral section and closing the circuit breaker after the source collector leaves the neutral section; and determining re-establishment of electrical cooperation with an electrified section and verifying the position of the source collector on an electrified section with the GPS determined location before closing the circuit breaker.

15. A method of controlling an electrified vehicle traveling over path having a sectionalized electrified conductor running along the path, the electrified sections being separated by neutral sections, the vehicle including a source collector cooperating with the electrified conductor and a circuit breaker which is opened by a control system when the control system determines that source collector is passing through the neutral section; wherein the vehicle is part of a train of vehicles; another vehicles in the train include a source collector and a circuit breaker which is opened when the source collector passes through the neutral section; and the following method is performed on the vehicle and the another vehicle:

determining the geographic location of the vehicle using a GPS system;

determining the position of the vehicle relative to the position of the neutral section from the geographic location of the neutral section stored on the vehicle and the GPS determined location of the vehicle; and opening the circuit breaker before the source collector enters the neutral section and closing the circuit breaker after the source collector leaves the neutral section.

16. A method of controlling an electrified vehicle traveling over path having a sectionalized electrified conductor running along the path, the electrified sections being separated by neutral sections, the vehicle including a source collector cooperating with the electrified conductor and a circuit breaker which is opened by a control system when the control system determines that source collector is passing through the neutral section; wherein the vehicle is part of a train of vehicles; another vehicle includes a source collector and a circuit breaker which is opened when the source collector passes through the neutral section; the method comprising:

determining the geographic location of the vehicle using a GPS system;

determining the position of the vehicle relative to the position of the neutral section from the geographic location of the neutral section stored on the vehicle and the GPS determined location of the vehicle;

opening the circuit breaker before the source collector enters the neutral section and closing the circuit breaker after the source collector leaves the neutral section; and wherein the vehicle has a master control system which determines the position of each vehicle of the train relative to the neutral section and signals remote control system of the another vehicle to maintain its circuit breaker open as the source collector of the another vehicle passes through the neutral section.

17. The method of claim 16, wherein the master control system predetermines the position within the train of each vehicle.

* * * * *